United States Patent
Shultz et al.

(10) Patent No.: US 10,392,757 B2
(45) Date of Patent: Aug. 27, 2019

(54) ELECTRIC LINE STRIPER

(71) Applicant: Graco Minnesota Inc., Minneapolis, MN (US)

(72) Inventors: Mark D. Shultz, Fridley, MN (US); David M. Larsen, Albertville, MN (US); James C. Schroeder, Ramsey, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 15/865,510

(22) Filed: Jan. 9, 2018

(65) Prior Publication Data
US 2018/0195241 A1     Jul. 12, 2018

Related U.S. Application Data

(60) Provisional application No. 62/444,153, filed on Jan. 9, 2017.

(51) Int. Cl.
*E01C 23/22*     (2006.01)
*E01C 23/16*     (2006.01)
(Continued)

(52) U.S. Cl.
CPC ............ *E01C 23/22* (2013.01); *B05B 12/002* (2013.01); *B05B 13/005* (2013.01); *B62D 63/02* (2013.01);
(Continued)

(58) Field of Classification Search
CPC .... E01C 23/22; E01C 23/0993; E01C 23/163; E01C 23/166; E01C 23/222; B05B 13/005; B05B 12/002; B62D 63/02
See application file for complete search history.

(56) References Cited

U.S. PATENT DOCUMENTS 3,230,570 A     1/1966  Flippen
4,893,751 A *   1/1990  Armstrong .............. E01C 23/22
                                                   118/305
(Continued)

FOREIGN PATENT DOCUMENTS

FR     2593529 A1     7/1987
FR     2746823 A1     10/1997
(Continued)

OTHER PUBLICATIONS

Extended European Search Report for EP Application No. 18150834.2, dated Sep. 11, 2018, 13 Pages.
(Continued)

*Primary Examiner* — Abigail A Risic
(74) *Attorney, Agent, or Firm* — Kinney & Lange, P.A.

(57) ABSTRACT

A line striper for ground marking with a sprayable fluid includes a horizontal frame, a front wheel mounted to the horizontal frame, a left rear wheel and a right rear wheel mounted to the horizontal frame, a rear axle extending from one or both of the left rear wheel and the right rear wheel, a mounting arm assembly connected to the horizontal frame, a spray gun mounted on the mounting arm assembly and positioned for spraying the ground, a pump mounted on the horizontal frame, the pump configured to pump the sprayable fluid to the spray gun, and a fluid reservoir support stage removably positioned over the horizontal frame.

19 Claims, 10 Drawing Sheets

(51) Int. Cl.
 *B05B 13/00* (2006.01)
 *B05B 12/00* (2018.01)
 *E01C 23/09* (2006.01)
 *B62D 63/02* (2006.01)
 *A63C 19/06* (2006.01)

(52) U.S. Cl.
 CPC ........ *E01C 23/0993* (2013.01); *E01C 23/163* (2013.01); *E01C 23/166* (2013.01); *E01C 23/222* (2013.01); *A63C 2019/067* (2013.01)

(56) References Cited

U.S. PATENT DOCUMENTS

| | | | | |
|---|---|---|---|---|
| 5,203,923 | A * | 4/1993 | Hartman | B05B 9/06 |
| | | | | 118/323 |
| 5,263,789 | A | 11/1993 | Torntore et al. | |
| 7,611,076 | B1 * | 11/2009 | Street | B05B 9/007 |
| | | | | 239/176 |
| 8,936,119 | B1 * | 1/2015 | Valler | B60K 6/40 |
| | | | | 180/65.21 |
| 2010/0189887 | A1 * | 7/2010 | Nielsen | G06Q 10/06 |
| | | | | 427/136 |
| 2011/0057052 | A1 * | 3/2011 | Heatley | A63C 19/065 |
| | | | | 239/71 |
| 2012/0072035 | A1 * | 3/2012 | Nielsen | B05B 12/004 |
| | | | | 700/283 |
| 2015/0097054 | A1 * | 4/2015 | Schroeder | E01C 23/22 |
| | | | | 239/172 |
| 2015/0330039 | A1 * | 11/2015 | Vanneman | E01C 23/163 |
| | | | | 404/94 |
| 2015/0352570 | A1 | 12/2015 | Lins et al. | |
| 2015/0361968 | A1 * | 12/2015 | Schroeder | F04B 13/02 |
| | | | | 417/53 |
| 2016/0002868 | A1 * | 1/2016 | McGuffie | A63C 19/065 |
| | | | | 427/137 |
| 2017/0204571 | A1 * | 7/2017 | Shultz | E01C 23/22 |
| 2017/0204572 | A1 * | 7/2017 | Kuczenski | E01C 23/22 |

FOREIGN PATENT DOCUMENTS

GB 946541 A 1/1964
JP 2012231768 A 11/2012

OTHER PUBLICATIONS

Partial European Search Report for EP Serial No. 18150834.2, dated Jun. 8, 2018, 15 Pages.
Extended European Search Report for EP Application No. 18150831.8, dated Jun. 14, 2018, 8 Pages.

* cited by examiner

ELECTRIC LINE STRIPER

CROSS-REFERENCE TO RELATED APPLICATION(S)

This application claims the benefit of U.S. Provisional Application No. 62/444,153 filed Jan. 9, 2017 for "ELECTRIC LINE STRIPER" by Mark D. Shultz, David M. Larsen, and James C. Schroeder, which is fully incorporated by reference herein. Reference is also made to U.S. application Ser. No. 15/865,524, entitled ELECTRIC LINE STRIPER WITH INVERTER, filed concurrently.

BACKGROUND

The present disclosure relates generally to line striping systems, and in particular, to wheeled line striping systems.

Wheeled line striping systems are used to paint stripes on roads, parking lots, athletic fields, and in indoor facilities. Traditional line striping systems include an internal combustion engine and a liquid fuel tank from which the engine draws fuel, such as gasoline. The engine runs to reciprocate a pump onboard the line striping system to pump paint. The combustion engine is noisy and emits fumes, which may be undesirable in certain striping locations. Further, wheeled line striping systems can be heavy and difficult to maneuver.

SUMMARY

A line striper for ground marking with a sprayable fluid includes a horizontal frame, a front wheel mounted to the horizontal frame, a left rear wheel and a right rear wheel mounted to the horizontal frame, a rear axle extending from one or both of the left rear wheel and the right rear wheel, a mounting arm assembly connected to the horizontal frame, a spray gun mounted on the mounting arm assembly and positioned for spraying the ground, a pump mounted on the horizontal frame, the pump configured to pump the sprayable fluid to the spray gun, and a fluid reservoir support stage removably positioned over the horizontal frame.

A line striper for ground marking with a sprayable fluid, the line striper powered by at least one battery, includes a horizontal frame, a front wheel mounted to the horizontal frame, a left rear wheel and a right rear wheel mounted to the horizontal frame, a rear axle extending from at least one of the left rear wheel and the right rear wheel, a mounting arm assembly connected to the horizontal frame, a spray gun mounted on the mounting arm assembly and positioned for spraying the ground, a pump mounted on the horizontal frame, the pump configured to pump the sprayable fluid to the spray gun, and a battery bay including a rear compartment located rearward of the rear axle and having space for holding a battery of the at least one battery.

A line striper for ground marking with a sprayable fluid, the line striper powered by at least one battery, includes a horizontal frame, a front wheel mounted to the horizontal frame, a left rear wheel and a right rear wheel mounted to the horizontal frame, a rear axle extending from at least one of the left rear wheel and the right rear wheel, a mounting arm assembly connected to the horizontal frame, a spray gun mounted on the mounting arm assembly and positioned for spraying the ground, a pump mounted on the horizontal frame, the pump configured to pump the sprayable fluid to the spray gun, and a battery bay located directly between the left rear wheel and the right rear wheel. The battery bay is a space for holding the at least one battery.

A line striper for ground marking with a sprayable fluid, the line striper powered by at least one battery, includes a horizontal frame, a front wheel mounted to the horizontal frame, a left rear wheel and a right rear wheel mounted to the horizontal frame, a rear axle extending from at least one of the left rear wheel and the right rear wheel, a mounting arm assembly connected to the horizontal frame, a spray gun mounted on the mounting arm assembly and positioned for spraying the ground, a pump mounted on the horizontal frame, the pump configured to pump the sprayable fluid to the spray gun, and a battery bay that extends partially below the rear axle. The battery bay is a space for holding the at least one battery.

DETAILED DESCRIPTION

In general, the present disclosure describes a line striper including a removable stage for holding a fluid reservoir and positioning the fluid reservoir over a rear axle, which protects a battery bay while still permitting easy access to the battery bay and distributes the weight of the fluid reservoir. Further, the battery bay is configured to position batteries on the line striper such that the batteries are directly between rear wheels and balanced with respect to a rear axle, protecting the batteries and making the line striper more maneuverable.

Figure 1:
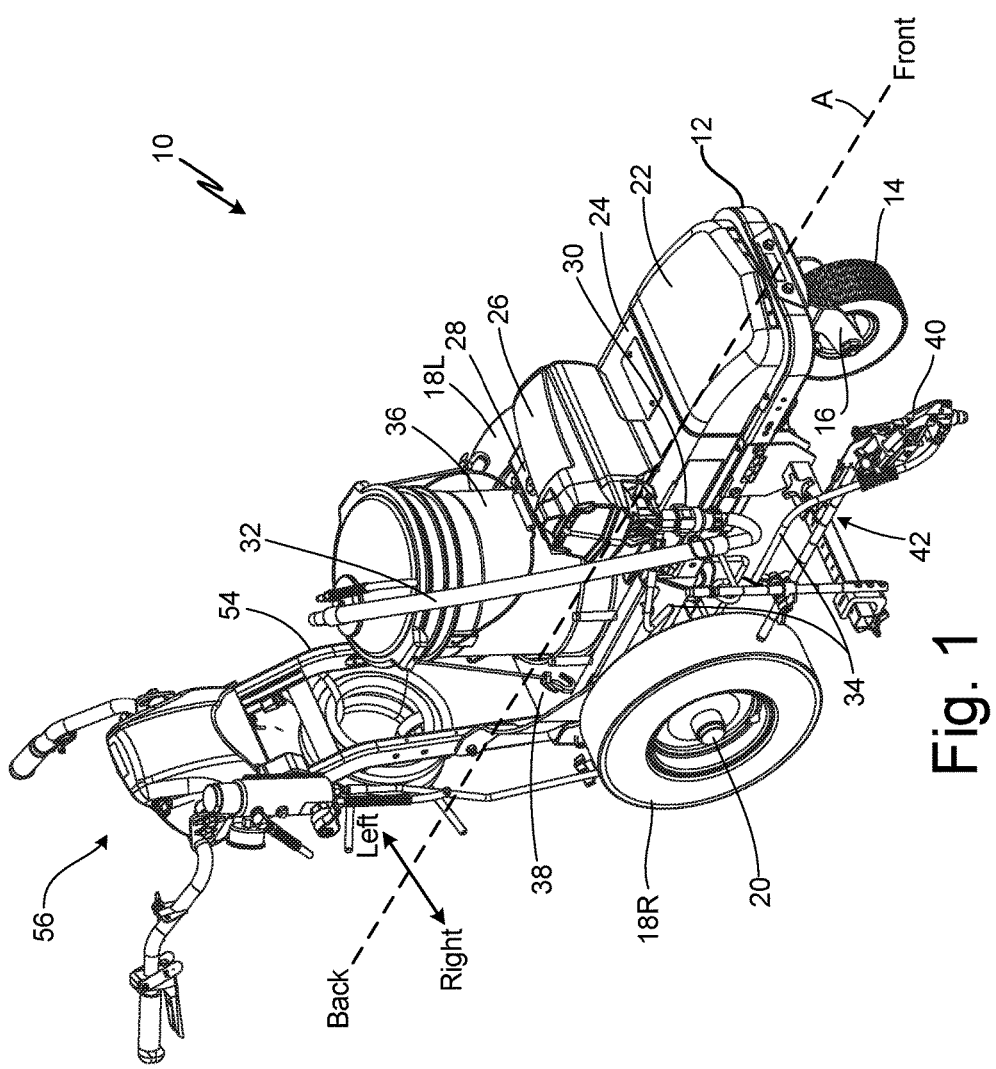
FIG. 1 is a perspective front view of a line striper.
Figure 2:
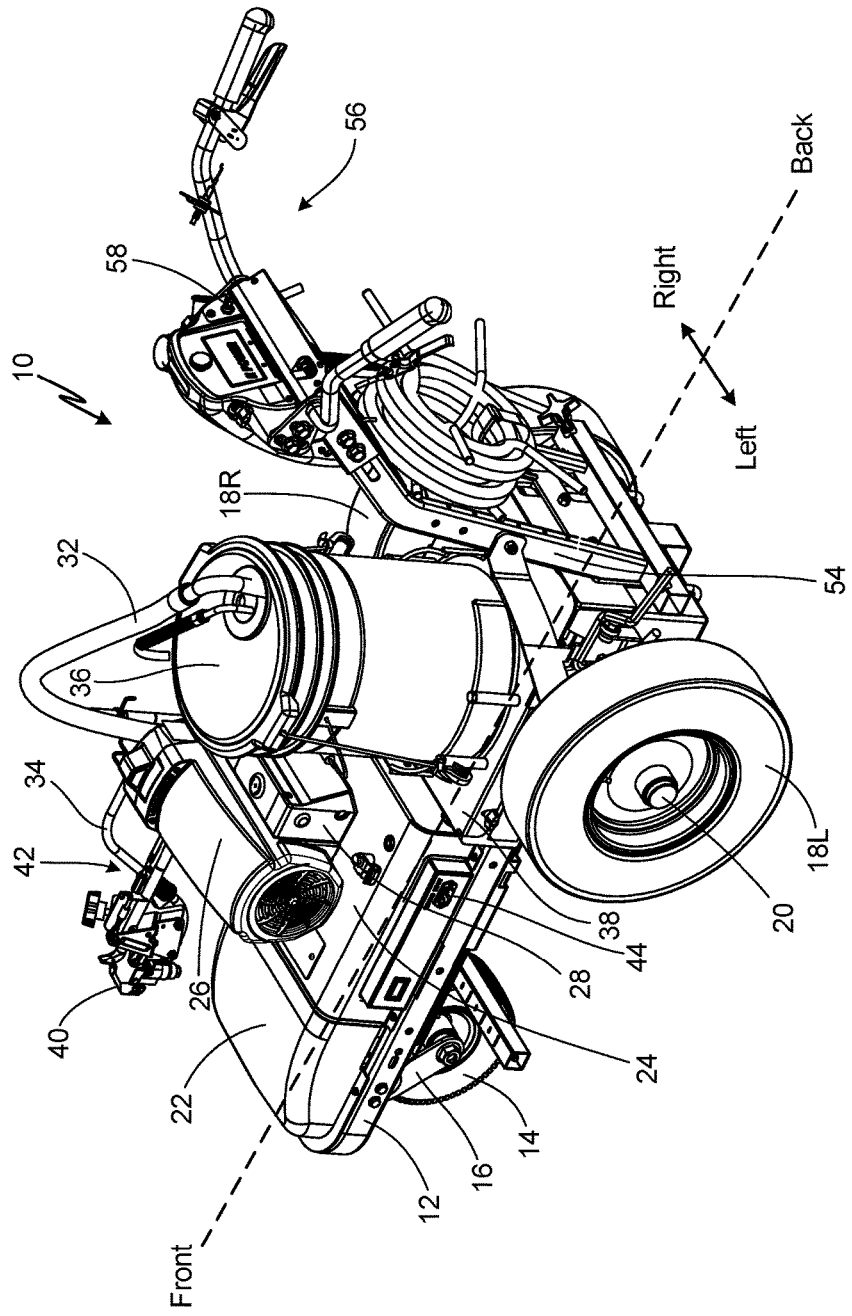
FIG. 2 is a perspective rear view of the line striper.
Figure 3:
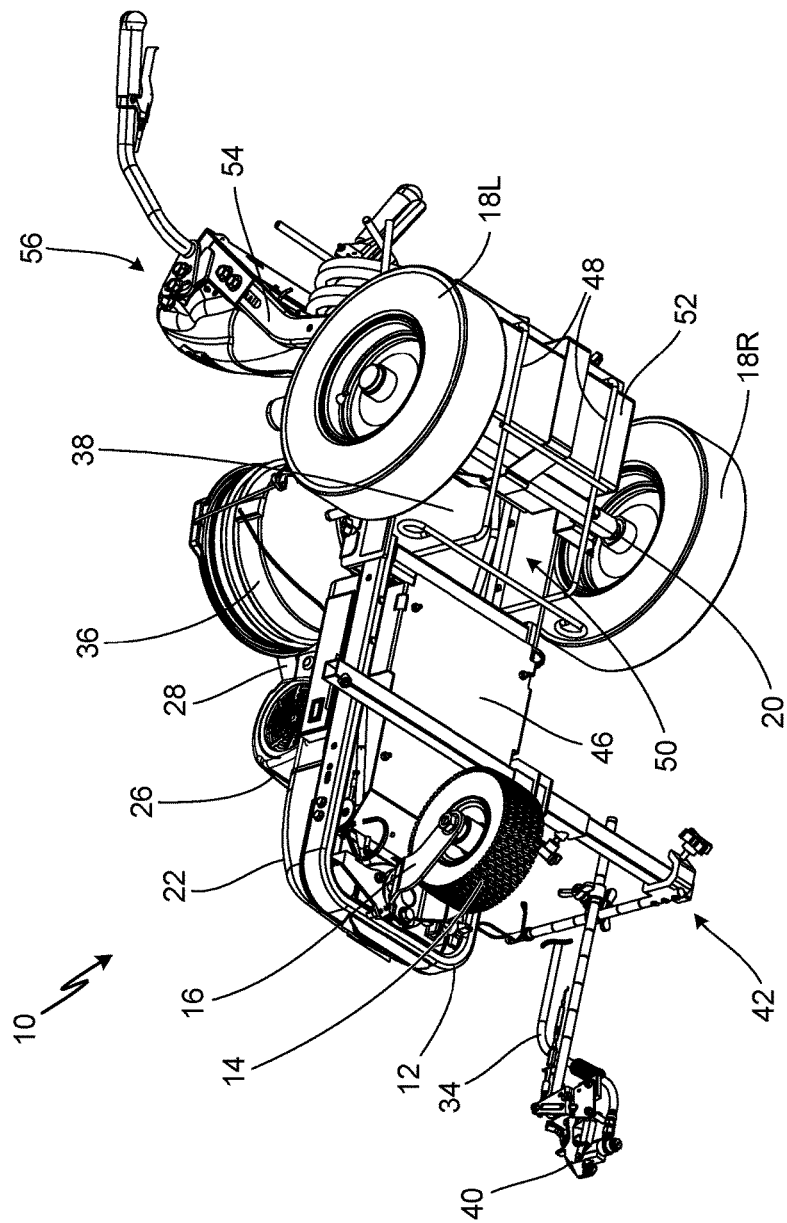
FIG. 3 is perspective bottom view of the line striper.

FIG. 1 is a perspective front view of line striper 10. FIG. 2 is a perspective rear view of line striper 10. FIG. 3 is perspective bottom view of line striper 10. FIGS. 1, 2, and 3 will be discussed together. Line striper 10 includes horizontal frame 12, front wheel 14, swivel mount 16, left rear wheel 18L, right rear wheel 18R, rear axle 20, front cover 22, middle cover 24 (shown in FIGS. 1 and 2), motor 26, motor control 28, pump 30 (shown in FIG. 1), intake hose 32 (shown in FIGS. 1 and 2), output hoses 34, fluid reservoir 36, stage 38, spray gun 40, mounting arm assembly 42, plug 44 (shown in FIG. 2), underside plate 46 (shown in FIG. 3), underside support 48 (shown in FIG. 3), battery bay 50 (shown in FIG. 3), first battery 52 (shown in FIG. 3), vertical frame 54, and operator station 56 (which includes power switch 58, shown in FIG. 2).

Line striper 10 has a generally rectangular horizontal frame 12 elongated along longitudinal axis A, which indicates a front and a back, or rear, orientation of line striper 10. Horizontal frame 12 is generally planar and oriented parallel with the ground. Horizontal frame 12 is formed of pieces of tubular metal, plate metal, a combination of tubular metal and plate metal, or any other suitably-shaped metal, the metal being rigidly fixed together, such as with welding or bolts. In this embodiment, horizontal frame 12 has rounded corners. In alternate embodiments, horizontal frame 12 may have squared corners. Front wheel 14 is mounted to horizontal frame 12 near a front or first end of horizontal frame 12 via swivel mount 16. Swivel mount 16 is attached to front wheel 14 and to the front, or first end, of horizontal frame 12. Left rear wheel 18L and right rear wheel 18R are mounted to horizontal frame 12 near a back, or second end, of horizontal frame 12 via rear axle 20. Left rear wheel 18L and right rear wheel 18R are mounted on opposite ends of rear axle 20. As such, rear axle 20 extends from left rear wheel 18L and right rear wheel 18R between left rear wheel 18L and right rear wheel 18R. Rear axle 20 is attached to horizontal frame 12 such that left rear wheel 18L and right rear wheel 18R are positioned on opposite sides of horizontal frame 12. Rear axle 20 may be a single axle or two independent but axially aligned axles, such as stub axles.

Front cover 22 is positioned above a front portion of horizontal frame 12, which is near the first end of horizontal frame, such that it covers a front portion of line striper 10. Front cover 22 can be a polymeric molded plate. Middle cover 24 is positioned above a middle portion of horizontal frame 12 such that it covers a middle portion of line striper 10. Middle cover 24 can be a polymeric molded plate. Motor 26 is positioned above horizontal frame 12, such that motor 26 is adjacent middle cover 24. Motor 26 is an electric motor. Motor 26 may be a rotor-stator motor, a brushless motor, or any other suitable electric motor. Motor control 28 is attached to motor 26 at a side of motor 26. Pump 30 is attached to motor 26 at an end of motor 26 and mounted on horizontal frame 12. Pump 30 may be a piston pump or any other suitable pump. A first end of intake hose 32 and first ends of output hoses 34 are attached to pump 30. A second end of intake hose 32 is attached to or in fluid communication with fluid reservoir 36. In this embodiment, fluid reservoir 36 is a bucket. Fluid reservoir 36 is positioned on and supported by stage 38. Stage 38 is a metal plate removably positioned over horizontal frame 12. Second ends of output hoses 34 are attached to or in fluid communication with spray gun 40. Spray gun 40 is mounted on mounting arm assembly 42. Spray gun 40 is oriented to point downward toward the ground and is positioned for spraying the ground. Line striper 10 may have any number of spray guns 40. Mounting arm assembly 42 is connected to horizontal frame 12. As such, spray gun 40 is mounted on horizontal frame 12.

Plug 44 is positioned on a side of line striper 10. Plug 44 accepts a conventional power cord (not shown) that plugs into a standard electrical wall outlet that supplies an AC wall outlet signal (e.g. a 120 volt 60 hertz signal, or a 230 volt 50 hertz signal, depending on the region).

Underside plate 46 is positioned at a bottom of line striper 10 such that underside plate 46 extends below horizontal frame 12. Underside plate 46 is positioned below a middle portion and a front portion of horizontal frame 12. Underside support 48 is rigidly connected to horizontal frame 12 and positioned at a back portion of horizontal frame 12. Underside support 48 is adjacent underside plate 46 and below stage 38. Underside support 48 hangs below horizontal frame 12 and rear axle 20 between left rear wheel 18L and right rear wheel 18R. In this embodiment, underside support 48 is composed of two elongated metal members (e.g. bent rods). In alternate embodiments, underside support 48 may be formed from metal or polymer sheets. Underside support 48 forms a bottom portion or a bottom support of battery bay 50. Battery bay 50 is a partially or fully enclosed space for holding one or more batteries that can power line striper 10. Battery bay 50 extends below horizontal frame 12 and rear axle 20. Battery bay 50 is below, or beneath, stage 38 such that stage 38 is over battery bay 50 and covers battery bay 50. Stage 38 is removable to expose battery bay 50. Battery bay 50 is located directly between left rear wheel 18L and right rear wheel 18R. As seen in FIG. 3, battery bay 50 accepts first battery 52. Underside support 48 cradles first battery 52. As such, first battery 52 is partially below horizontal frame 12. First battery 52 is a rear battery as it is in the rear-most position within battery bay 50. First battery 52 may be a rectangular battery. For example, first battery 52 is shown as a standard rectangular box battery used in the automotive and/or marine industry. First battery 52 may be a deep cycle marine battery (e.g. lead-acid), a lithium battery, or any other suitable battery.

Vertical frame 54 is attached to the back or second end of horizontal frame 12. As such, horizontal frame supports vertical frame 54. Vertical frame 54 is oriented substantially orthogonal to horizontal frame 12. Vertical frame 54 can be constructed similarly to horizontal frame 12. Vertical frame supports a hose reel, a filter, and components of operator station 56. Operator station 56 may include components such as a display, controls, handle bars, levers, buttons, and switches. Operator station 56 includes power switch 58.

Front wheel 14, left rear wheel 18L, and right rear wheel 18R support horizontal frame 18 and all components on line striper 10. Front cover 22 and middle cover 24 conceal and protect internal components of line striper 10. Underside plate 46 supports and protects components carried on horizontal frame 12.

Motor control 28 controls, at least in part, the operation of motor 26. Motor 26 provides a mechanical input to pump 30 via, for example, gearing and a yoke or crank, to drive pump 30. Pump 30 pulls paint from fluid reservoir 36 through intake hose 32. By action of a piston or other type of pump mechanism, pump 30 pumps and outputs paint under high pressure through output hoses 34 for spraying from spray gun 40. As such, pump supplies paint, or other line striping fluid, to spray gun 40. Spray gun 40 points downward toward the ground to spray paint on the ground. Spray gun 40 can be actuated from operator station 56 using manual controls, assisted controls, automatic controls, or a combination thereof. Power from plug 44 is used to operate motor 26 directly or indirectly by use of a battery. Power switch 58 is used to turn motor 26 on and off.

Typically, a user holds handlebars of operator station 20 and pushes line striper 10 forward. Paint may be sprayed from spray gun 40 of line striper 10 onto the ground to paint stripes. While a line striper that paints stripes is used herein as an example, any fluid or material may be dispensed on any ground or floor surface in any pattern.

Conventionally, line stripers use an internal combustion engine to power the pump in order to pump paint. Combustion engines emit fumes, making them undesirable for indoor striping, such as in sports arenas, warehouses, factories, and indoor parking facilities. As such, the use of a combustion engine may limit the environments and situations in which line striping can be performed. Further, combustion engines are noisy, making them undesirable for striping at night in locations proximate residential areas. Unfortunately, the most convenient time to strip roads and parking lots is often at night because traffic is at a minimum. Using a battery powered electric motor 26 to power pump 30 reduces vibration and noise generated by line striper 10, making it possible to stripe at night. Moreover, line striper 10 powered by first battery 52 does not emit fumes, making it suitable for indoor line striping and increasing the environments in which it can be used.

Figure 4:
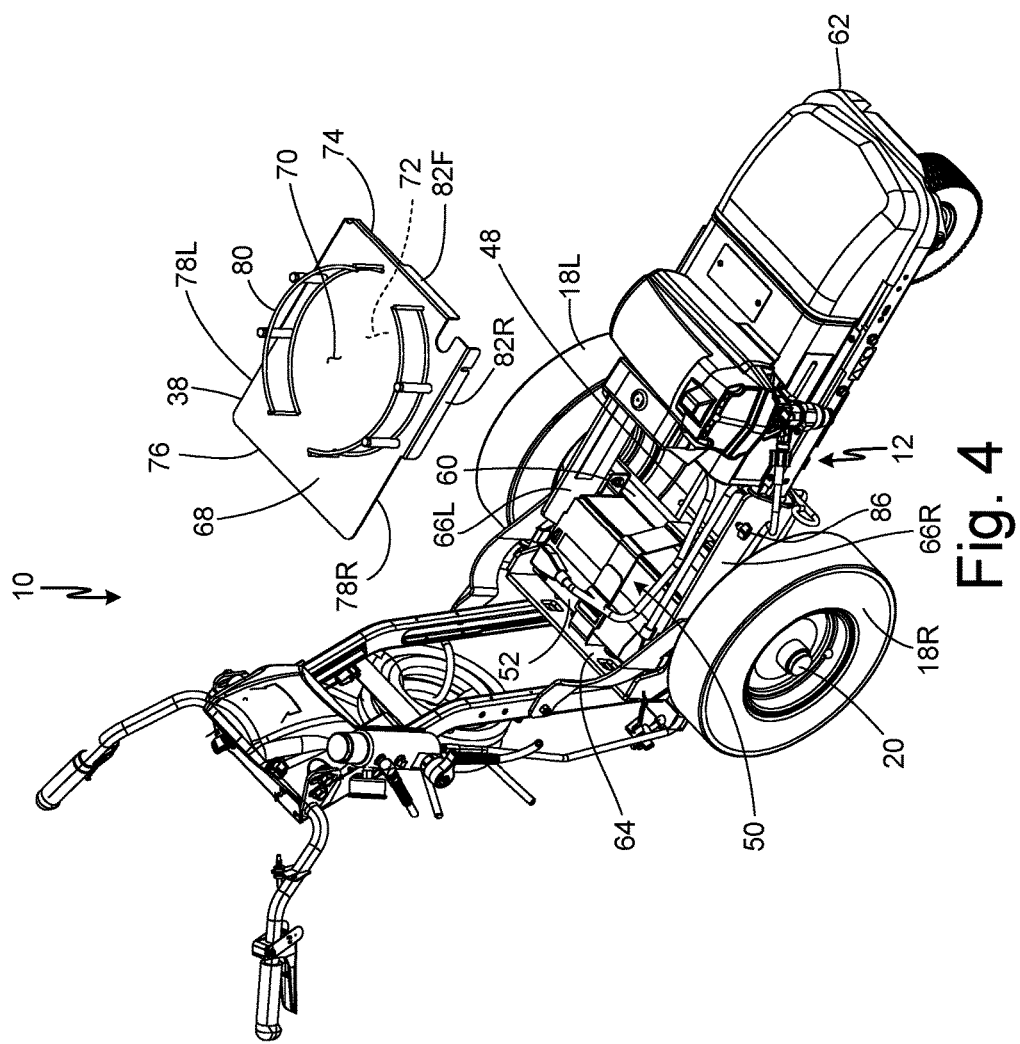
FIG. 4 is a perspective top view of the line striper with a stage removed to the side.
Figure 5:
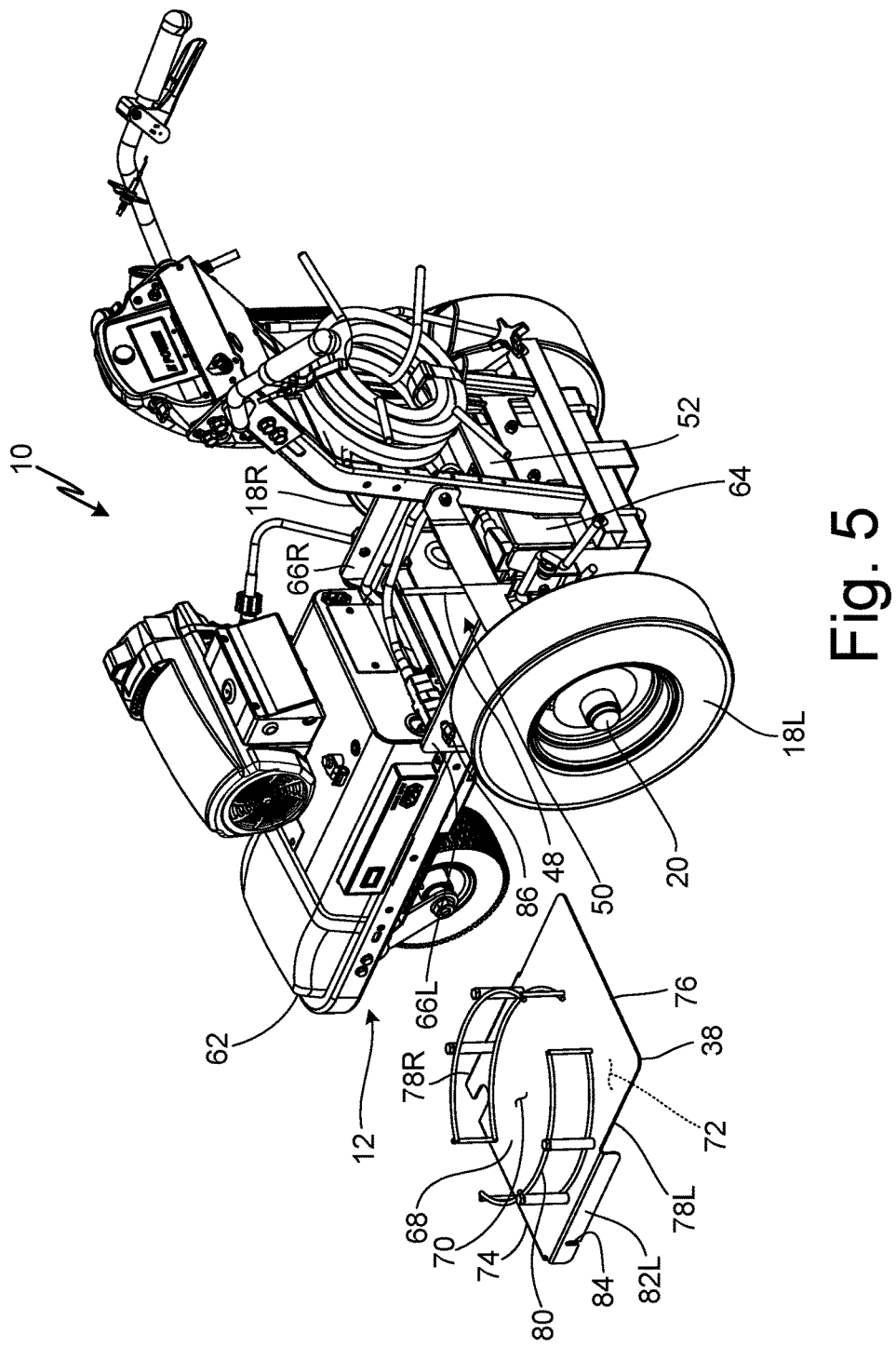
FIG. 5 is a perspective top view of the line striper with the stage removed to the side.

FIG. 4 is a perspective top view of line striper 10 with stage 38 removed to the side. FIG. 5 is a perspective top view of line striper 10 with stage 38 removed to the side. FIGS. 4 and 5 will be discussed together. Line striper 10 includes horizontal frame 12, left rear wheel 18L, right rear wheel 18R, rear axle 20, fluid reservoir 36 (shown in FIGS. 1-3), stage 38, underside support 48, battery bay 50, first battery 52, and crossbar 60 (shown in FIG. 4). Horizontal frame 12 includes front section 62, rear section 64, left side section 66L, and right side section 66R. Stage 38 includes base 68 (which includes top surface 70, bottom surface 72, front end 74, rear end 76, left lateral side 78L, and right lateral side 78R), wire frame ring 80, front flange 82F (shown in FIG. 4), left flange 82L (shown in FIG. 5), which includes slot 84, and right flange 82R (shown in FIG. 4), which includes slot 84, and fasteners 86.

Line striper 10 has the same structure as described in reference to FIGS. 1, 2, and 3. Fluid reservoir 36 is positioned on and supported by stage 38. Stage 38 is a metal plate removably positioned on horizontal frame 12 such that stage 38 rests on horizontal frame 12. Stage 38 is positioned over rear axle 20, underside support 48, and battery bay 50. Underside support 48 extends below horizontal frame 12 between left rear wheel 18L and right rear wheel 18R and forms the bottom portion of battery bay 50. Underside support 48 can cradle one or more batteries. As such, battery bay 50 is between left rear wheel 18L and right rear wheel 18R and accepts one or more batteries. In this embodiment, battery bay 50 is configured such that when first battery 52 is positioned in battery bay 50, first battery 52 is entirely directly between left rear wheel 18L and right rear wheel 18R. In alternate embodiments, battery bay 50 may be configured such that when first battery 52 is positioned in battery bay 50, first battery 52 is partially directly between left rear wheel 18L and right rear wheel 18R. As shown in FIGS. 4 and 5, first battery 52 is a rear battery. Crossbar 60 extends between a first side of horizontal frame 12 and a second side of horizontal frame 12 in battery bay 50. Crossbar 60 is above rear axle 20. Crossbar 60 is metal.

Horizontal frame 12 has front section 62 at a front, or first end, of horizontal frame 12. Front wheel 14 is mounted to horizontal frame 12 at front section 62. Rear section 64 is at a back, or second end, of horizontal frame 12. Rear section 64 is opposite front section 62. Left rear wheel 18L, right rear wheel 18R, and rear axle 20 are mounted to horizontal frame 12 adjacent rear section 64. Vertical frame 54 is mounted to horizontal frame 12 at rear section 64. Left side section 66L, or left section, extends from front section 62 to rear section 64 at a first side, or left side, of horizontal frame 12. Left side section 66L connects to front section 62 at a corner and connects to rear section 64 at a corner. Right side section 66R, or right section, extends from front section 62 to rear section 64 at a second side opposite the first side, or right side, of horizontal frame 12. As such, right side section 66R is opposite left side section 66L. Right side section 66R connects to front section 62 at a corner and to rear section 64 at a corner. Left rear wheel 18L is mounted at left side section 66L and right rear wheel 18R is mounted at right side section 66R. A first end of crossbar 60 is attached to left side section 66L and a second end of crossbar 60 is attached to right side section 66R such that crossbar 60 extends between left side section 66L and right side section 66R. Front section 62, rear section 64, left side section 66L, and section side section 66R can be formed from different types of support members, such as tubular members (elongated hollow members which can be generally square, rectangular, or circular in cross-sectional profile) in some sections and flat plates in other sections. One piece of metal may form a portion or the entirety of one or more of front section 62, rear section 64, left side section 66L, and right side section 66R (and can bend at the corners to transition into the different sections).

Stage 38 has planar base 68 with top surface 70 at a top of base 68 and a bottom surface 72 at a bottom of base 68. Front end 74 of base 68 is at a first end, or front, of base 68. Front end 74 has a cut-out. Rear end 76 of base 68 is at a second end, or rear, of base 68, which is opposite front end 74. Bottom surface 72 near rear end 76 may rest on a top surface of rear section 64 of horizontal frame 12. Left lateral side 78L of base 68 is at a first side, or left side, of base 38 and extends from front end 74 to rear end 76. Right lateral side 78R of base 68 is at a second side, or right side, of base 68 and extends from front end 74 to rear end 76. Bottom surface 72 near left lateral side 78L rests on top surface of left side section 66L of horizontal frame, and bottom surface 72 near right lateral side 78R rests on top surface of right side section 66R of horizontal frame 12.

Wire frame ring 80 is attached to top surface 70 of base 68. Wire frame ring 80 is segmented and shaped to surround fluid reservoir 36. Fluid reservoir 36 is placed within wire frame ring 80. Front flange 82F is attached to base 68 and is generally orthogonal to base 68. Front flange 82F is attached to front end 74 and extends downward from base 68. Left flange 82L is attached to base 68 and is generally orthogonal to base 68. Left flange 82L is attached to left lateral side 78L and extends downward from base 68. Right flange 82R is attached to base 68 and is generally orthogonal to base 68. Right flange 82R is attached to right lateral side 78R and extends downward from base 68. Front, left, and right flanges 82F, 82L, and 82R can extend over and wrap partially around horizontal frame 12. For example, left and right flanges 82L and 82R can extend over and wrap partially around left side section 66L and right side section 66R, respectively. In alternate embodiments, stage 38 may have any number of flanges 82, and flanges 82 may be attached to one or more of front end 74, rear end 76, left lateral side 78L, and right lateral side 78R. In this embodiment, left flange 82L and right flange 82R each include a slot 84. Slots 84 are spaces in flanges 82L and 82R that can accept fasteners. Fasteners 86, such as screws, extend through slots 84 and screw into apertures in the outsides of left side section 66L and right side section 66R of horizontal frame 12. As shown in FIG. 4, stage 38 can easily be lifted up and away from line striper 10 by loosening fasteners 86. Likewise, stage 38 can easily be set in place by lowering stage 38 to rest on horizontal frame 12 and engaging fasteners 86 to secure stage 38 to horizontal frame 12.

Stage 38 supports fluid reservoir 36. Stage 32 is positioned on horizontal frame 12 over rear axle 20 so that fluid reservoir 36 is located over rear axle 20, distributing the weight of the paint in fluid reservoir 36 on both front and back sides of rear axle 20. Wire frame ring 80 supports fluid reservoir 36 on stage 38. Crossbar 60 structurally supports rear axle 20. As such, the weight of line striper 10, which is supported by left side section 66L and section side section 66R and transferred to crossbar 60, is further transferred to rear axle 20. The weight is then transferred from rear axle 20 to left rear wheel 18L and right rear wheel 18R.

Stage 38 covers various components of line striper 10 that are underneath stage 38, including battery bay 50. Stage 38 directly covers a top portion of battery bay 50, including covering an entire topside of any battery, such as first battery 52, contained therein. Left flange 82L extends over and wraps partially around left side section 66L and right flange 82R extends over and wraps partially around right side section 66R and to prevent stage 38 from sliding on horizontal frame 12. Fasteners 86 help secure stage 38 to horizontal frame 12 to prevent movement of stage 38. Fasteners 86 can be disengaged from slots 84 in stage 38, and stage can easily be lifted up and away from line striper 10 to remove stage 38 and expose battery bay 50.

Battery bay 50 positions first battery 52 entirely directly between left rear wheel 18L and right rear wheel 18R such that left rear wheel 18L and right rear wheel 18R cover both lateral sides of first battery 52.

Line striping can be messy, with paint being spilled and sprayed in unintended areas. Stage 38 protects battery bay 50. Stage 38 prevents paint, water (from cleaning or from rain), and other fluids from contacting first battery 52, or any other battery, in battery bay 50.

Stage 38 is also easily removable such that removing stage 38 for cleaning or replacement is quick and easy. Further, locating easily removable stage 38 above battery bay 50 permits easy access to battery bay 50. As a result, replacing batteries, such as first battery 52, within battery bay 50 is also quick and easy. Importantly, the battery is the component within horizontal frame 12 that is in need of removal, replacement, and/or servicing most frequently during the life of line striper 10.

Some line striping projects can lead to inadvertent damage to the components of line striper 10. For example, frequent maneuvering can lead to accidently running line striper 10 into curbs during outdoor striping or into objects during indoor striping (such as in warehouses or factories). Because first battery 52 is positioned partially below horizontal frame 12, first battery 52 poses a hazard. First battery 52 is at risk of being impacted when line striper 10 runs into curbs or objects, and impacted batteries can leak and/or ignite. Such risk is minimized because left rear wheel 18L and right rear wheel 18R protect first battery 52. Left rear wheel 18L and right rear wheel 18R cover both lateral sides of first battery 52, which decreases the number of paths along which an object could impinge on first battery 52. Additionally, the position of stage 32 balances the load of fluid reservoir 36, which is a particularly heavy component of line striper 10. As a result, maneuvering line striper 10 is easier and smoother.

Figure 6:
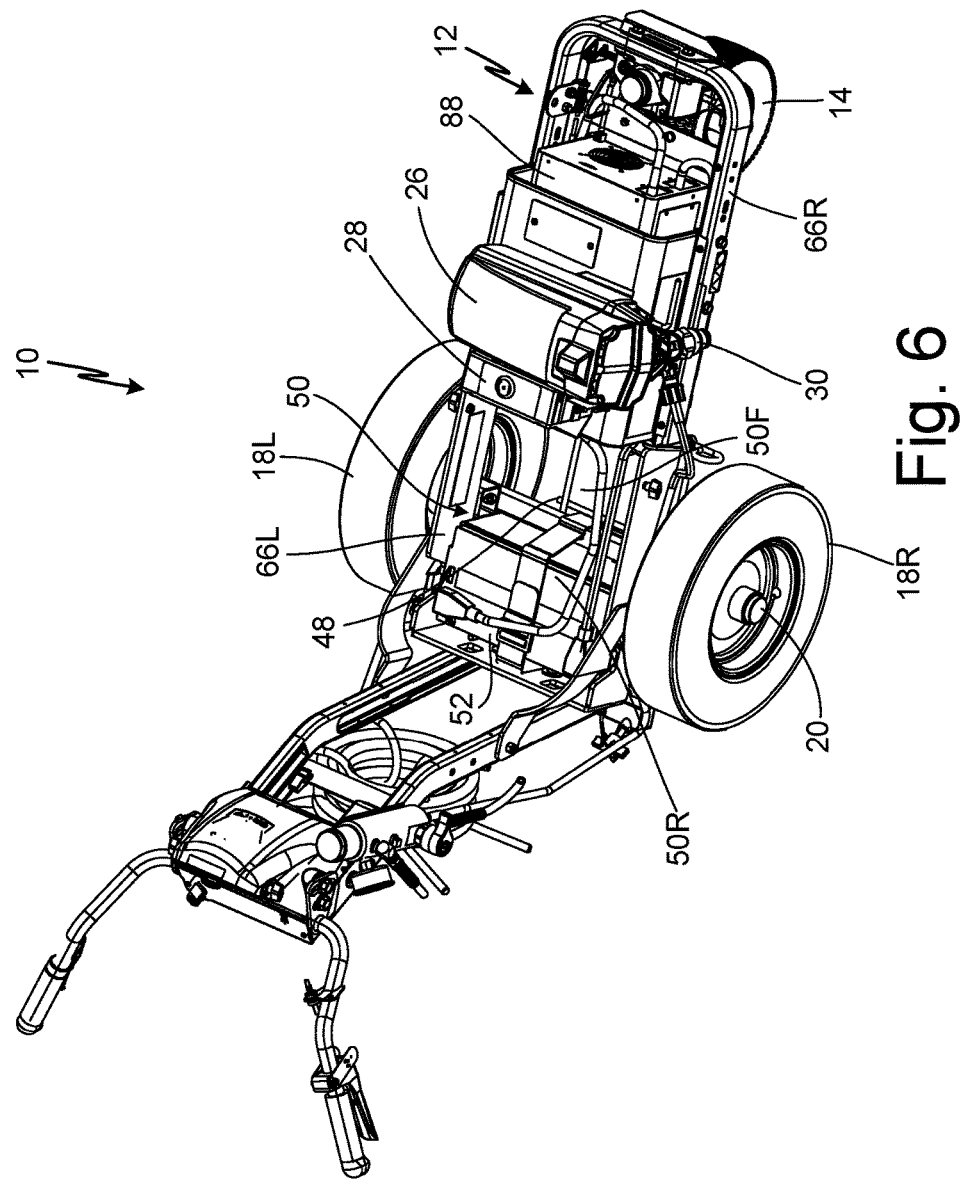
FIG. 6 is a perspective top view of the line striper with the stage and a front cover removed to show a battery bay with a first battery.
Figure 7:
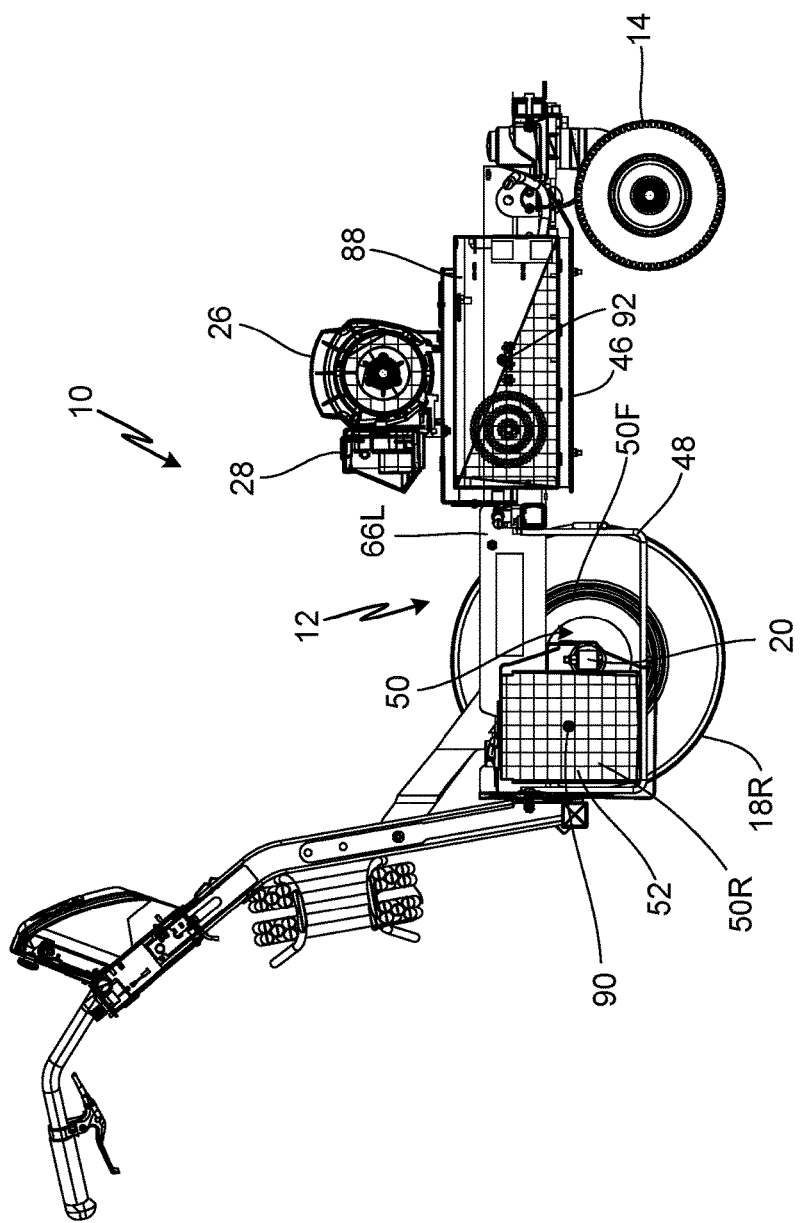
FIG. 7 is a cross-sectional side view of the line striper of FIG. 6 taken along the longitudinal axis of FIGS. 1 and 2.

FIG. 6 is a perspective top view of line striper 10 with stage 38 and front cover 22 removed to show battery bay 50 with first battery 52. FIG. 7 is a cross-sectional side view of line striper 10 of FIG. 6 taken along the longitudinal axis of FIGS. 1 and 2. FIGS. 6 and 7 will be discussed together. Line striper 10 includes horizontal frame 12, front wheel 14, left rear wheel 18L (shown in FIG. 6), right rear wheel 18R, rear axle 20, front cover 22 (shown in FIGS. 1-5), middle cover 24 (shown in FIGS. 1-5), motor 26, motor control 28, pump 30 (shown in FIG. 6), fluid reservoir 36 (shown in FIGS. 1-3), stage 38 (shown in FIGS. 1-5), underside plate 46, underside support 48, battery bay 50 (which includes rear compartment 50R and forward compartment 50F), first battery 52, and inverter 88. Horizontal frame 12 includes left side section 66L, and right side section 66R (shown in FIG. 6). First battery 52 includes center of mass 90 (shown in FIG. 7). Inverter 88 includes center of mass 92 (shown in FIG. 7).

Line striper 10 has the same structure as described in reference to FIGS. 1-5. Motor 26 is positioned above a bottom of horizontal frame 12 and above rear axle 20. Pump 30 is attached to motor 26 and also positioned above the bottom of horizontal frame 12 and rear axle 20. Stage 38, which supports fluid reservoir 36, is removably positioned on horizontal frame 12 such that stage 38 rests on horizontal frame 12 above, or over, rear axle 20, underside support 48, and battery bay 50. Battery bay 50 extends rearward and forward of rear axle 20. Battery bay 50 has rear compartment 50R, which is a portion of battery bay located rearward of rear axle 20, and forward compartment 50F, which is a portion of battery bay located forward of rear axle 20. Rear compartment 50R and forward compartment 50F are equidistant from rear axle 20. First battery 52 is positioned rearward of rear axle 20 in rear compartment 50R and supported by horizontal frame 20. As such, horizontal frame 12 is cantilevered from rear axle 20. Inverter 88 is positioned below motor 26 and above underside plate 46. Inverter 88 is within horizontal frame 12 between left side section 66L and right side section 66R of horizontal frame 12. Inverter 88 is located in front of rear axle 20 and between first and right rear wheels 18L and 18R and front wheel 14. Inverter 88 is forward of rear compartment 50R and forward compartment 50F of battery bay 50. Inverter 88 is positioned such that inverter is covered by front cover 22 and middle cover 24.

Center of mass 90 of first battery 52 is located below the bottom of horizontal frame 12 (and thus below the whole of horizontal frame 12). Because first battery 52 is located partially below rear axle 20 and partially above horizontal frame 12, center of mass 90 is located below horizontal frame 12 and above rear axle 20. Center of mass 92 of inverter 88 is located between a top and the bottom of horizontal frame 12 such that center of mass 92 is not above or below left side section 66L or right side section 66R. Center of mass 92 is located directly between left side section 66L and right side section 66R of horizontal frame 12.

Line striper 10 is typically pushed forward when spraying stripes. Line striper 10 may be turned about left rear wheel 18L and right rear wheel 18R in some turn maneuvers of line striper 10. Alternatively, line striper 10 may be pivoted such that left rear wheel 18L and right rear wheel 18R rotate in opposite directions. Locating first battery 52 in rear compartment 50R behind rear axle 20, fluid reservoir 36 on stage 38 over rear axle 20 (which distributes the weight of the paint both in front of and behind rear axle 20), and inverter 88 in front of rear axle 20 positions the heavy components on opposite sides of rear axle 20, the point about which line striper 10 is rotated. Such positioning balances the turning load of line striper 10. Balancing the heavy components with respect to rear axle 20 minimizes the distance that the particularly heavy components have to travel while turning.

A bottom portion of battery bay 50 extends below horizontal frame 12 and rear axle 20 to position first battery 52 partially above and partially below rear axle 20 and partially above and partially below the bottom of horizontal frame 12 so that center of mass 90 is located below horizontal frame 12 and above rear axle 20. Lowering center of mass 90 of first battery 52 lowers the center of mass of line striper 10.

Inverter 88 converts direct current (DC) power output from first battery 52, and possibly an additional battery, to alternating current (AC) power that is routed to motor control 28. Motor control 28 converts the AC power to DC power that is input to motor 26 to cause motor 26 to output mechanical motion that reciprocates pump 30. Inverter 88 can also supply motor control 28 with AC power from a wall outlet (via plug 44). Additionally, inverter 88 can supply DC power to first battery 52 to charge first battery 52.

Parking lot and indoor striping projects often require numerous short stripes, requiring frequent turning and repositioning of the line striper. For example, the line striper may have to be repositioned to the starting location for spraying each stripe. Frequent maneuvering of line striper 10 could be particularly fatiguing to the user because line striper 10 includes several particularly heavy components, resulting in a unit that can weigh several hundred pounds. Among the particularly heavy components are fluid reservoir 36 filled with paint, first battery 52 (as well as any additional battery), and inverter 88. A user pushing line striper 10 is at risk of become fatigued while pushing and maneuvering line striper 10 during a project. The relative positioning of the particularly heavy components on line striper 10 is designed to minimize such fatigue by improving maneuverability of line striper 10. For example, balancing the turning load of line striper 10 minimizes the manual energy expenditure, and resulting fatigue, of the user during the turning maneuvers of line striper 10.

Additionally, positioning fluid reservoir 36 and motor 26 relatively high on line striper 10 is beneficial as it allows for easy refilling and servicing by the user. Unfortunately, such positioning can make a line striper top heavy and at risk of tipping. Lowering center of mass 90 of first battery 52, thereby minimizing the height of the center of mass of line striper 10, makes line striper 10 easier to handle, more maneuverable, and less prone to tipping.

Motor control 28 can receive one type of input power (e.g. AC power) while inverter 88 can receive either or both of DC power from first battery 52 or AC power from a standard electrical wall outlet via plug 44 and supply power to motor control 28 in the form of the AC power that motor control 28 can accept. As such, motor 26 may run on power from a wall outlet or from first battery 52 when a standard electrical wall outlet is unavailable. When a standard wall outlet is available, first battery 52 can be charged. Further, inverter 88 allows motor control 28 and motor 26 to be configured similarly to motors used outside of the line striper industry, which are designed to accept an AC wall outlet power from a standard electrical wall outlet. Such motors can be used with line striper 10.

Figure 8:
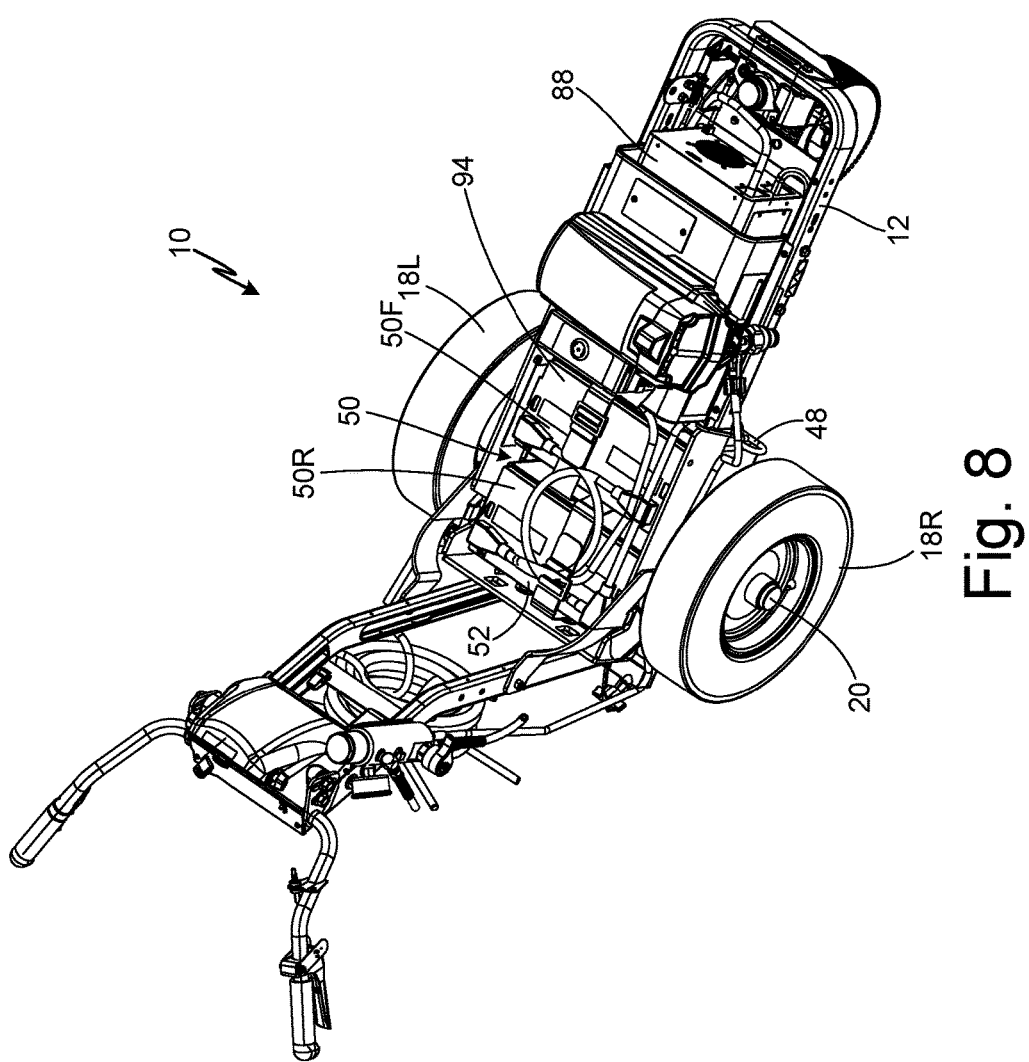
FIG. 8 is a perspective top view of the line striper with the stage and the front cover removed to show the battery bay with the first battery and a second battery.
Figure 9:
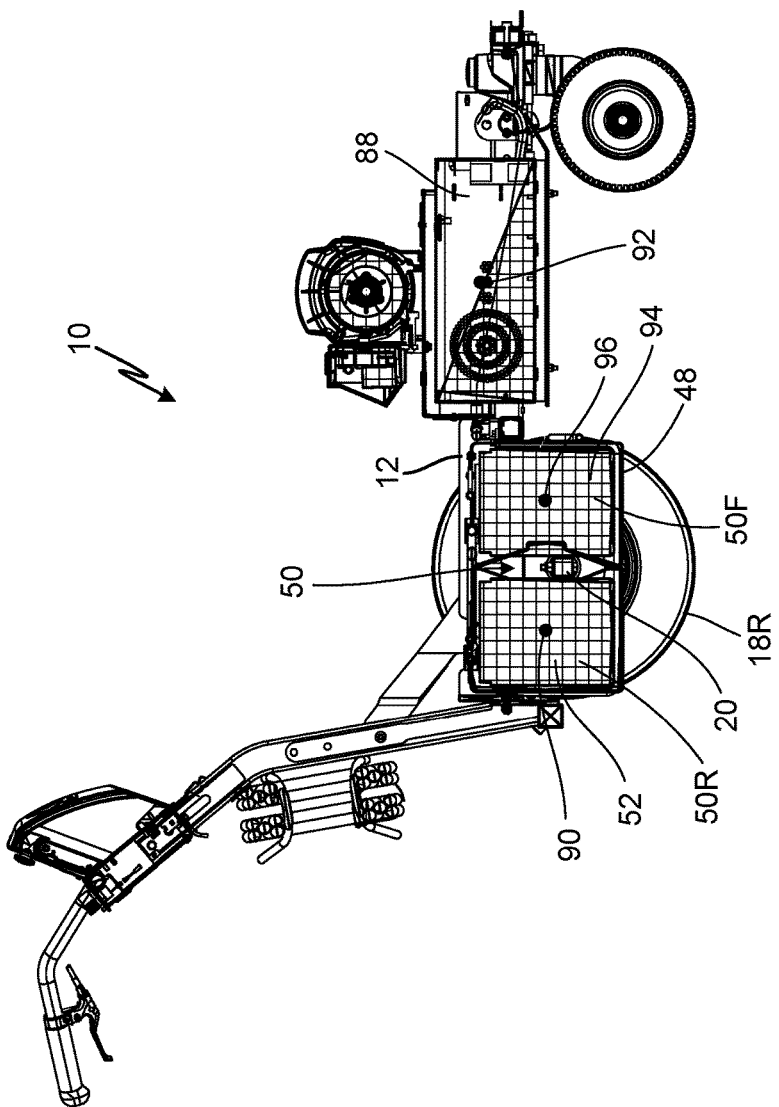
FIG. 9 is a cross-sectional side view of the line striper of FIG. 8 taken along the longitudinal axis of FIGS. 1 and 2.

FIG. 8 is a perspective top view of line striper 10 with stage 38 and front cover 22 removed to show battery bay 50 with first battery 52 and second battery 94. FIG. 9 is a cross-sectional side view of line striper 10 of FIG. 8 taken along the longitudinal axis of FIGS. 1 and 2. FIGS. 8 and 9 will be discussed together. Line striper 10 includes horizontal frame 12, left rear wheel 18L, right rear wheel 18R, rear axle 20, fluid reservoir 36 (shown in FIGS. 1-3), underside support 48, battery bay 50 (which includes rear compartment 50R and forward compartment 50F), first battery 52, inverter 88, and second battery 94. First battery 52 includes center of mass 90 (shown in FIG. 9). Inverter 88 has center of mass 92 (shown in FIG. 9). Second battery 94 includes center of mass 96 (shown in FIG. 9).

Line striper 10 has the same structure as described in reference to FIGS. 1-7. Line striper 10 also includes second battery 94. As seen in FIGS. 8 and 9, battery bay 50 accepts second battery 94 in forward compartment 50F, and underside support 48 cradles second battery 94. Second battery 94 is a front battery as it is in forward compartment 50F, or the front-most position within battery bay 50. Thus, second battery 94 is positioned in battery bay 50 adjacent to and forward of first battery 52. Second battery 94 is positioned forward of rear axle 20 in forward compartment 50F of battery bay 50. Rear compartment 50R and forward compartment 50F of battery bay are balanced on opposite sides of rear axle 20 such that first battery 52 and second battery 94 are close to, equidistant from, and balanced on opposite sides of rear axle 20. Rear axle 20 is directly between rear compartment 50R and forward compartment 50F, and thus, rear axle 20 is directly between first battery 52 and second battery 94. In this embodiment, first battery 56 and second battery 94 butt up against rear and front sides of rear axle 20, respectively. Second battery 94 is in the equivalent vertical position as first battery 52. Like first battery 52, second battery 94 is also positioned partially above and partially below the bottom of horizontal frame 12 and partially above and partially below rear axle 20 when placed in battery bay 50. Second battery 94 is also rear of inverter 88. Second battery 94 may be rectangular. For example, second battery 94 is shown as a standard rectangular box battery used in the automotive and/or marine industry. Second battery 94 may also be a deep cycle marine battery (e.g. lead-acid), a lithium battery, or any other suitable battery. Center of mass 90 is located behind, or rearward of, rear axle 20 while center of mass 96 is located in front, or forward, of rear axle 20. Center of mass 90 and center of mass 96 are located equidistant from rear axle 20 as measured along the longitudinal axis of FIG. 1. Center of mass 96 of second battery 94 is located below the bottom of horizontal frame 12 (and thus below the whole of horizontal frame 12). Center of mass 96 is located above rear axle 20.

Battery bay 50 positions second battery 94 partially above and partially below rear axle 20 and partially above and partially below the bottom of horizontal frame 12 so that center of mass 96 is located below horizontal frame 12 and above rear axle 20. Lowering center of mass 96 of first battery 52 lowers the center of mass of line striper 10. Battery bay 50 also positions second battery 94 entirely directly between left rear wheel 18L and right rear wheel 18R such that left rear wheel 18L and right rear wheel 18R cover both lateral sides of second battery 94. Additionally, because rear compartment 50R and forward compartment 50F of battery bay are balanced on opposite sides of rear axle 20, positioning first battery 52 and second battery 94 close to, equidistant from, and balanced on opposite sides of rear axle 20, the weight of first battery 52 and second battery 94 are balanced about a common point of rotation (rear axle 20) to minimize the net force that must be applied by the user when turning line striper 10. Second battery 94 is also balanced about rear axle 20 with respect to fluid reservoir 36 and inverter 88, particularly center of mass 92, as described above in reference to first battery 52 in FIGS. 6 and 7.

Second battery 94 is among the particularly heavy components of line striper 10. A user pushing line striper 10 is at risk of become fatigued while pushing and maneuvering line striper 10 during a project. The positioning of the second battery 94 with respect to first battery 52 and rear axle 20 is designed to minimize such fatigue by improving maneuverability of line striper 10. Lowering center of mass 96 of second battery 94 also contributes to minimizing the height of the center of mass of line striper 10, making line striper 10 easier to handle, more maneuverable, and less prone to tipping.

Because second battery 94 is positioned partially below horizontal frame 12, second battery 94 poses a hazard. Second battery 94 is at risk of being impacted when line striper 10 runs into curbs or objects, and impacted batteries can leak and/or ignite. Such risk is minimized by locating second battery 94 entirely directly between left rear wheel 18L and right rear wheel 18R such that left rear wheel 18L and right rear wheel 18R are covering both lateral sides of first battery 94 and the paths along which an object could impinge on second battery 94 is decreased.

Figure 10:
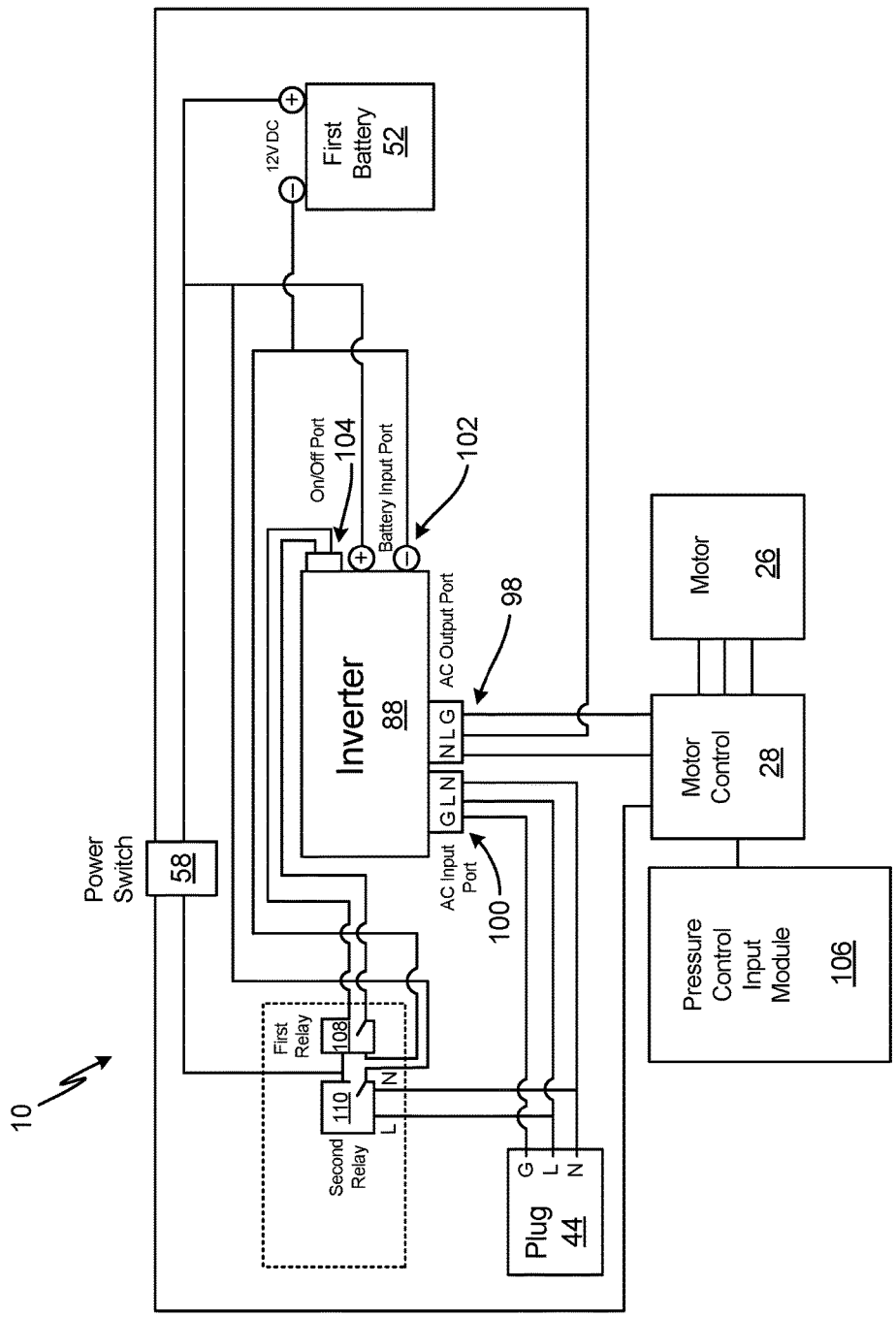
FIG. 10 is a block diagram of the line striper showing circuitry of the line striper.

FIG. 10 is a block diagram of line striper 10 showing circuitry of line striper 10. Line striper 10 includes motor 26, motor control 28, pump 30 (shown in FIG. 1), intake hose 32 (shown in FIG. 1), plug 44, first battery 52, operator station 56 (shown in FIG. 1), power switch 58, inverter 88 (which includes AC output port 98, AC input port 100, battery input port 102, and on/off port 104), pressure control input module 106, first relay 108, and second relay 110.

Line striper 10 has the same structure as described in reference to FIGS. 1-7. Line striper 10 may also include second battery 94 as described in reference to FIGS. 8 and 9. Motor 26 is an electric motor, as stated above. Motor 26 is a DC motor, or accepts DC power and does not accept AC power. Motor 26 is electrically connected to motor control 28. Motor control 28 is an AC motor control, or accepts AC power and does not accept DC power. Motor control 28 is electrically connected to inverter 88. Motor control 28 is also electrically connected to power switch 58. Specifically, power switch 58 is electrically connected to motor control 28 and inverter 88, between motor control 28 and inverter 88. Power switch 58 is also electrically connected to first battery 52. Power switch 58 may be a mechanical toggle having two positions corresponding to an on position and an off position. Power switch 58 is the only user-actuable externally-accessible power switch of line striper 10. Power switch 58 controls power to one or both of inverter 88 and motor control 28. Power switch 58 gates two electrical pathways. First battery 52 is also connected to inverter 88. First battery 52 typically outputs a direct current at 12 volts. First battery 52 can be any rechargeable battery. While only first battery 52 is shown in FIG. 10, second battery 94 can be used additionally or alternatively in the same manner as first battery 52. Inverter 88 is further electrically connected to plug 44.

Inverter 88 has AC output port 98. AC output port 98 is configured to output AC power. Inverter 88 is electrically connected to motor control 28 via AC output port 98. Inverter 88 is also electrically connected to power switch 58 via AC output port 98. Specifically, power switch 58 is electrically connected between AC output port 98 and motor control 28. AC output port 98 can output AC power from inverter 88 that is similar or identical to an AC wall outlet power (e.g. 120 V, 60 Hz power or other regionally appropriate standard AC power). Inverter 88 has AC input port 100. Inverter 88 is electrically connected to plug 44 via AC input port 100. AC input port 100 is configured to accept AC power. Plug 44 is electrically connected to inverter 88 via AC input port 100. Plug 44 can accept a power cord, such as a standard electrical extension cord, to connect to a standard electrical wall outlet and convey AC power from the wall outlet to AC input port 100 of inverter 88. Inverter 88 has battery input port 102. First battery 52 is electrically connected to inverter 88 via battery input port 102. Battery input port 102 is configured to accept DC power. Battery input port 102 is also configured to deliver, or output, DC power to first battery 52. Inverter 88 has on/off port 104. On/off port 104 has two electrical pathways running through on/off port 104, which are part of the same circuit.

Pressure control input module 106 is connected to motor control 28. Pressure control input module 106 can be part of a circuit at operator station 56 that allows the user to set a desired pressure level, such as with a potentiometer dial or digital set point circuit indicating different pressure levels. Additionally or alternatively, pressure control module 106 can be a pressure transducer located downstream of pump 30 (e.g. upstream of intake hose 32 or along intake hose 32) to measure fluid pressure output by pump 30. The circuitry of motor control 28 can include an integrated circuit configured to increase or decrease the DC power output by motor control 28 based on the measured pressure and set pressure.

First relay 108 is electrically connected to inverter 88 through on/off port 104. The circuit of on/off port 104 runs through first relay 108. First relay 108 is also electrically connected to power switch 58. First relay 108 is electrically connected between power switch 58 and on/off port 104 of inverter 88. Further, power switch 58 is electrically connected between first relay 108 and first battery 52. First relay 108 can comprise a relay circuit having one or more relays. First relay 108 is electrically connected to second relay 110. Second relay 110 is electrically connected to plug 44. Second relay 110 can comprise a relay circuit having one or more relays. In alternate embodiments, first relay 108 and second relay 110 can be inside inverter 88. First relay 108 and second relay 110 can comprise a relay circuit.

Inverter 88 receives AC power from a wall outlet via plug 44 and AC input port 100. Inverter 88 may route the AC wall outlet power from AC input port 100 to AC output port 98. In routing the AC wall outlet signal between AC input port 100 and AC output port 98, inverter 88 may not alter the signal in any way (e.g. no rectifying, filtering, modulating, conditioning, or any other alteration). Inverter 88 outputs the AC power from AC output port 98 to motor control 28. Motor control 28 rectifies and conditions the AC power and routes the rectified power to motor 26. Such rectification and conditioning can include converting the AC wall outlet power to DC power and lowering the voltage of the signal from the peak AC wall outlet signal voltage (e.g. by use of diodes and inductors). The DC power from motor control 28 powers, or drives, motor 26.

Pressure control input module 106 induces circuitry of motor control 28 to modulate the DC power output to motor 26 (e.g. by increasing or decreasing the voltage). Pressure control input module 106 can communicate an indicated pressure level or a measured pressure to motor control 28 to achieve the desired pressure. For example, the DC power output by motor control 28 to motor 26 can be increased to increase the speed of the motor when the measured pressure is below a set pressure. Likewise, the power of the DC signal output by motor control 28 to motor 26 can be decreased to decrease the speed of the motor when the measured pressure is above a set pressure. As such, motor 26 is a variable speed motor 26.

Each time inverter 88 is powered on, inverter 88 checks whether an AC wall outlet signal is being received through AC input port 100. If so, inverter 88 uses the AC wall outlet signal. If the AC wall outlet signal is not detected, inverter 88 uses power from first battery 52. While powered, inverter 88 may periodically check (e.g. every 15 seconds) whether the AC wall outlet signal is available and always prefer to use the AC wall outlet signal source of power over power from first battery 52.

First battery 52 is electrically connected to battery input port 102 to supply electrical power in the form of DC power to inverter 88. Inverter 88 accepts DC power (typically 12 volts) from first battery 52. Likewise, inverter 88 can deliver DC power to first battery 52, recharging first battery 52. Inverter 88 converts the DC power into AC power (e.g. by using a switch to rapidly reverse the polarity of the signal and capacitors and inductors to smooth the switching signal). The converted AC power may be similar to the AC wall outlet signal output by a standard electrical wall outlet (e.g.

120 V, 60 Hz power or other regionally appropriate standard AC power). The converted AC power is then routed through AC output port 98 to output the power to motor control 28. Motor control 28 rectifies and conditions the AC power and delivers it to motor 26 as DC power.

Inverter 88 must be turned on to both (1) route the AC wall outlet power from AC input port 100 to AC output port 98 and (2) convert the DC power from battery input port 102 into AC power and route the converted AC power to AC output port 98. The modules of inverter 88 that perform such functions only do so when powered. Inverter 88 does not route the AC wall outlet power between AC input port 100 and AC output port 98 or convert the DC power from battery input port 102 into AC power for output via the AC output port 98 when inverter 88 is not powered on or is otherwise in an off state. Inverter 88 must also be turned on to charge first battery 52.

Inverter 88 powers off or on when power switch 58 is toggled to the off position or the on position, respectively. Power switch 58 operates to open or close the two electrical pathways gated by power switch 58 in tandem such that both pathways are either broken to disallow current flow or completed to permit current flow. As such, power switch 58 controls first relay 108. When power switch 58 is in the off position, the two electrical pathways gated by power switch 58 are open. As a result, the electrical circuit that would otherwise power first relay 108 is open and first relay is not powered. Consequently, inverter 88 is not powered on. Additionally, when power switch 58 is in the off position and the two electrical pathways gated by power switch 58 are open, power switch 58 cuts off power from inverter 88 to motor control 28. Conversely, when power switch 58 is in the on position, the two electrical pathways are closed. As a result, the electrical circuit that powers first relay 108 is closed. The low power signal from first battery 52 flows through power switch 58 to power first relay 108. Consequently, inverter 88 powers on. As such, power switch 58 controls first relay 108 to turn inverter 88 on.

Inverter 88 applies a potential difference (corresponding to a low voltage signal) between the two electrical pathways of the circuit running through on/off port 104, even when in an off state, to determine whether first relay 108 is powered or not. Such a function is powered by first battery 52, which is always connected to inverter 88 and supplying energy as needed. When first relay 108 is not powered, first relay 108 is open, opening the circuit running through first relay 108 and connecting to on/off port 104. An open state of first relay 108 prevents the flow of current through the circuit of the on/off port 104. As such, the low power signal of on/off port 104 does not conduct, causing inverter 88 to be in an off state. When first relay 108 is powered, first relay 108 closes the circuit running through first relay 108 and connecting to on/off port 104. A closed state of first relay 108 permits the flow of current through the circuit of the on/off port 104, allowing the low power signal to flow at on/off port 104. Inverter 88 detects the low voltage signal through on/off port 104, causing inverter 88 to power on. Inverter 88 may have one or more integrated circuits programmed to perform the checks and coordinate such functions.

Powering on inverter 88 or transitioning inverter 88 from the off state to the on state does not mean that inverter 88 was previously entirely not powered or was not performing any function. Rather, in the off, or unpowered state, inverter 88 does not output AC power from AC output port 98 (the power for which comes through either AC input port 100 or battery input port 102) and the circuitry that performs such function is not powered. In the on, or powered state, inverter 88 outputs the AC power from AC output port 98 and the circuitry which performs such function is powered on. Even while powered off, inverter 88 still operates sufficiently to check the continuity of the circuit that runs through on/off port 104 to monitor whether inverter 88 should turn on or remain off. As such, inverter 88 is not powered via the circuit of on/off port 104. Rather, the open or closed state of the circuit of on/off port 104 serves as a command to inverter 88 to power on or off. Power switch 58 determines whether first relay 108 is powered or not.

To run line striper 10 off of first battery 52 alone (not from plug 44), or to turn on inverter 88 for routing power from first battery 52 to motor control 28, the following actions happen in sequence: (1) power switch 58 is toggled from the off position to the on position; (2) the circuit associated with power switch 58 closes, allowing DC power from first battery 52 to power first relay 108; (3) the circuit that runs through on/off port 104 closes, allowing the low power signal to flow through on/off port 104; (4) inverter 88 is triggered to turn on and starts converting DC power from first battery 52 into AC power; (5) inverter 88 outputs the AC power to motor control 28 via AC output port 98; (6) motor control 28 turns on, converts the AC power to DC power, and outputs the DC power to motor 26 to run pump 30, which pumps paint for spraying line stripes.

To turn off motor 26 when running line striper 10 off of power from first battery 52 alone (not from plug 44), the following actions happen in sequence: (1) power switch 58 is toggled from the on position to the off position; (2) the circuit associated with power switch 58 opens, stopping DC power from first battery 52 from powering first relay 108; (3) the circuit that runs through on/off port 104 opens, no longer allowing the low power signal to flow through on/off port 104; (4) inverter 88 is triggered to turn off and stop converting the DC power from first battery 52 into AC power and stop outputting the AC power to motor control 28 via AC output port 98; (5) motor control 28 no longer powers motor 26, stopping pump 30 from pumping.

To charge first battery 52 while not line striping, power switch 58 is toggled to the off position, opening the circuit that goes from first battery 52 to first relay 108. DC power from first battery 52 is stopped from powering first relay 108, which powers down inverter 88. AC wall outlet power is supplied to plug 44, such as by connecting an extension cord between plug 44 and a standard electrical wall outlet. The AC power is routed to AC input port 100, supplying AC power to inverter 88 but alone not triggering inverter 88 to power on. Plug 44 controls second relay 110. The AC wall outlet power running through plug 44 is also routed to second relay 110, which powers second relay 110. When second relay 110 is powered by the AC wall outlet power, second relay 110 turns on to close a circuit that routes power from first battery 52 to first relay 108. As a result, power from first battery 52 powers first relay 108 to close the circuit that runs through on/off port 104, triggering inverter 88 to turn on. Inverter 88 starts converting the AC wall outlet power into DC power and routing the DC power to battery input port 102 to charge first battery 52. As such, second relay 110 turns on inverter 88 so that first battery 52 can be charged when line striper is connected to an AC wall outlet and power switch 58 is in the off position.

Even though inverter 88 is turned on to charge first battery 52, motor control 28 is not powered by inverter 88, and motor 26 cannot run because the circuit that runs from AC output port 98 to motor control 28 runs through power switch 58, which is in the off position. As previously stated, when power switch 58 is in the off position, the circuit between AC output port 98 and motor control 28 is open. As such, to charge first battery 52 while line striping, power switch 58 must be in the on position while AC wall outlet power is conducted through plug 44. Further, if plug 44 is receiving AC power, inverter 88 will be powered on and charge first battery 52 regardless of whether power switch 58 is in the on position or the off position.

Inverter 88 allows line striper 10 to have a single motor control 30 that accepts AC power but can run on electrical power derived from an AC wall outlet or a DC battery when a wall outlet is unavailable. Further, motor control 38 can use circuitry that would typically be used for motor controls that receive AC power directly (without an intervening inverter). As such, inverter 88 allows motor control 28 and motor 26 to be configured similarly to motors used outside of the line striper industry, which are designed to accept AC power from a standard electrical wall outlet. As a result, such motors can be used with line striper 10.

Additionally, line striper 10 can run (e.g. operate motor 26 and other electrical power-consuming components) solely off first battery 52. As such, no electrical or liquid fuel power source other than first battery 52 is necessary to run line striper 10. Thus, line striper 10 can be used in a greater number of environments, such as outside or in other environments that would otherwise not be possible to stripe in due to a lack of available power sources. When first battery 52 eventually depletes and needs recharging, line striper 10 can recharge first battery 52, reducing battery replacement, which saves time and money. When charging a battery while not line striping, energy is saved because inverter is not outputting AC power from AC output port 98. Consequently, the battery is recharged more quickly. Line striper 10 can also be operated to paint stripes while charging a battery, such that charging the battery does not cause delay.

Because second relay 110 can turn on inverter 88 to charge first battery 52 when power switch 58 is in the off position, line striper 10 can have a single power switch 58. From the perspective of the user, power switch 58 will have the effect of powering motor 26 on and off even though the manner in which motor 26 is powered by toggling power switch 58 is not as direct as the user may imagine. Having a single power switch 58 for the user is beneficial. In a line striper not including first relay 108 and second relay 110, a second power switch or a power switch with a third recharging position (besides on and off) is required to turn inverter 88 on, permitting recharging but cutting power to motor control 28 and motor 26. In such a line stripper, it is easy to just unplug the cord form plug 44 and forget to turn power switch 58 to the off position when battery charging is complete. Consequently, inverter 88 is left on and drains first battery 52 due to the high power consumption needed to maintain inverter 88 in an on state, even when inverter 88 is not outputting power. Using first relay 108 and second relay 110 to power-on inverter 88 when plug 44 is used allows power switch 58 to have only two positions (associated with motor-on and motor-off states). As a result, power switch 58 is disassociated from charging and inverter 88 may not have a separate "on" switch accessible to a user. Thus, the risk of inadvertent draining of first battery 52 is eliminated.

While paint has been used as an example of fluid sprayed from line striping system 10, other fluids and/or particles (e.g. beads, flowable solids, pellets, coatings, solvents, water, or oil) can be sprayed in addition to or instead of paint for ground marking.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A line striper for ground marking with a sprayable fluid, the line striper comprising:
   a horizontal frame;
   a front wheel mounted to the horizontal frame;
   a left rear wheel and a right rear wheel mounted to the horizontal frame;
   a rear axle extending from one or both of the left rear wheel and the right rear wheel;
   a mounting arm assembly connected to the horizontal frame;
   a spray gun mounted on the mounting arm assembly and positioned for spraying the ground;
   a pump mounted on the horizontal frame, the pump configured to pump the sprayable fluid to the spray gun; and
   a fluid reservoir support stage removably positioned over the horizontal frame, wherein the stage is positioned on the horizontal frame above the rear axle and extends rearward of the rear axle.

2. The line striper of claim 1, further including a fluid reservoir positioned on the stage.

3. The line striper of claim 1, and further including a battery bay below the stage configured to hold at least one battery, wherein the stage covers the battery bay and is removable to expose the battery bay.

4. The line striper of claim 1, wherein the horizontal frame further includes:
   a left side section; and
   a right side section opposite the left side section;
   wherein the stage rests on the left side section and the right side section.

5. The line striper of claim 1, wherein the stage includes a wire frame ring shaped to surround a fluid reservoir.

6. A line striper for ground marking with a sprayable fluid, the line striper comprising:
   a horizontal frame;
   a front wheel mounted to the horizontal frame;
   a left rear wheel and a right rear wheel mounted to the horizontal frame;
   a rear axle extending from one or both of the left rear wheel and the right rear wheel;
   a mounting arm assembly connected to the horizontal frame;
   a spray gun mounted on the mounting arm assembly and positioned for spraying the ground;
   a pump mounted on the horizontal frame, the pump configured to pump the sprayable fluid to the spray gun; and
   a fluid reservoir support stage removably positioned over the horizontal frame, wherein the stage includes:
      a planar base having a front end, a rear end, a left lateral side, and a right lateral side;
      a front flange extending from the front end of the base;
      a left flange extending from the left lateral side of the base; and
      a right flange extending from the right lateral side of base;

wherein the front flange, the left flange, and the right flange extend over and wrap partially around the horizontal frame.

7. The line striper of claim 6, further including:
a fastener extending into the left flange and the horizontal frame; and
a fastener extending into the right flange and the horizontal frame.

8. A line striper for ground marking with a sprayable fluid, the line striper powered by at least one battery, the line striper comprising:
a horizontal frame;
a front wheel mounted to the horizontal frame;
a left rear wheel and a right rear wheel mounted to the horizontal frame;
a rear axle extending from at least one of the left rear wheel and the right rear wheel;
a mounting arm assembly connected to the horizontal frame;
a spray gun mounted on the mounting arm assembly and positioned for spraying the ground;
a pump mounted on the horizontal frame, the pump configured to pump the sprayable fluid to the spray gun; and
a battery bay including a rear compartment, the rear compartment located entirely rearward of the rear axle and having space for holding a battery of the at least one battery.

9. A line striper for ground marking with a sprayable fluid, the line striper powered by at least one battery, the line striper comprising:
a horizontal frame;
a front wheel mounted to the horizontal frame;
a left rear wheel and a right rear wheel mounted to the horizontal frame;
a rear axle extending from at least one of the left rear wheel and the right rear wheel;
a mounting arm assembly connected to the horizontal frame;
a spray gun mounted on the mounting arm assembly and positioned for spraying the ground;
a pump mounted on the horizontal frame, the pump configured to pump the sprayable fluid to the spray gun; and
a battery bay including a rear compartment, the rear compartment located rearward of the rear axle and having space for holding a battery of the at least one battery, wherein the battery bay includes a forward compartment located forward of the rear axle and having space for holding a second battery, wherein the rear compartment and the forward compartment are equidistant from the rear axle.

10. A line striper for ground marking with a sprayable fluid, the line striper powered by at least one battery, the line striper comprising:
a horizontal frame;
a front wheel mounted to the horizontal frame;
a left rear wheel and a right rear wheel mounted to the horizontal frame;
a rear axle extending from at least one of the left rear wheel and the right rear wheel;
a mounting arm assembly connected to the horizontal frame;
a spray gun mounted on the mounting arm assembly and positioned for spraying the ground;
a pump mounted on the horizontal frame, the pump configured to pump the sprayable fluid to the spray gun;
a battery bay including a rear compartment, the rear compartment located rearward of the rear axle and having space for holding a battery of the at least one battery; and
an inverter positioned within the horizontal frame forward of the rear axle.

11. A line striper for ground marking with a sprayable fluid, the line striper powered by at least one battery, the line striper comprising:
a horizontal frame;
a front wheel mounted to the horizontal frame;
a left rear wheel and a right rear wheel mounted to the horizontal frame;
a rear axle extending from at least one of the left rear wheel and the right rear wheel;
a mounting arm assembly connected to the horizontal frame;
a spray gun mounted on the mounting arm assembly and positioned for spraying the ground;
a pump mounted on the horizontal frame, the pump configured to pump the sprayable fluid to the spray gun;
a battery bay including a rear compartment, the rear compartment located rearward of the rear axle and having space for holding a battery of the at least one battery; and
an underside support connected to the horizontal frame and forming a bottom portion of the battery bay.

12. The line striper of claim 8, further including:
a fluid reservoir support stage removably positioned on the horizontal frame; and
a fluid reservoir positioned on the stage such that the fluid reservoir is above the rear axle.

13. A line striper for ground marking with a sprayable fluid, the line striper powered by at least one battery, the line striper comprising:
a horizontal frame;
a front wheel mounted to the horizontal frame;
a left rear wheel and a right rear wheel mounted to the horizontal frame;
a rear axle extending from at least one of the left rear wheel and the right rear wheel;
a mounting arm assembly connected to the horizontal frame;
a spray gun mounted on the mounting arm assembly and positioned for spraying the ground;
a pump mounted on the horizontal frame, the pump configured to pump the sprayable fluid to the spray gun; and
a battery bay located directly between the left rear wheel and the right rear wheel, wherein the battery bay is a space for holding the at least one battery and extends partially below the rear axle.

14. A line striper for ground marking with a sprayable fluid, the line striper powered by at least one battery, the line striper comprising:
a horizontal frame;
a front wheel mounted to the horizontal frame;
a left rear wheel and a right rear wheel mounted to the horizontal frame;
a rear axle extending from at least one of the left rear wheel and the right rear wheel;
a mounting arm assembly connected to the horizontal frame;
a spray gun mounted on the mounting arm assembly and positioned for spraying the ground;

a pump mounted on the horizontal frame, the pump configured to pump the sprayable fluid to the spray gun; and a battery bay located directly between the left rear wheel and the right rear wheel, wherein the battery bay is a space for holding the at least one battery, wherein a bottom portion of the battery bay is formed by an underside support connected to the horizontal frame, the underside support extending below the horizontal frame and the rear axle such that the bottom portion of the battery bay is below the horizontal frame and the rear axle.

15. The line striper of claim 13, wherein the battery bay includes a rear compartment rearward of the rear axle for holding a first battery.

16. A line striper for ground marking with a sprayable fluid, the line striper powered by at least one battery, the line striper comprising:
   a horizontal frame;
   a front wheel mounted to the horizontal frame;
   a left rear wheel and a right rear wheel mounted to the horizontal frame;
   a rear axle extending from at least one of the left rear wheel and the right rear wheel;
   a mounting arm assembly connected to the horizontal frame;
   a spray gun mounted on the mounting arm assembly and positioned for spraying the ground;
   a pump mounted on the horizontal frame, the pump configured to pump the sprayable fluid to the spray gun; and
   a battery bay that extends partially below the rear axle, wherein the battery bay is a space for holding the at least one battery.

17. The line striper of claim 16, wherein a bottom portion of the battery bay extends below the horizontal frame and the rear axle, such that each of the at least one battery is positioned partially above and partially below a bottom of the horizontal frame and partially above and partially below the rear axle when the first battery is placed in the battery bay.

18. The line striper of claim 16, further including:
   a fluid reservoir support stage removably positioned on the horizontal frame; and
   a fluid reservoir positioned on the stage such that the fluid reservoir is above the rear axle and the horizontal frame.

19. The line striper of claim 16, further including a motor positioned above a bottom of the horizontal frame and above the rear axle; wherein the pump is connected to the motor and positioned above the bottom of the horizontal frame and above the rear axle.

* * * * *